(12) United States Patent
Lee et al.

(10) Patent No.: US 11,704,302 B2
(45) Date of Patent: Jul. 18, 2023

(54) METHOD, SYSTEM AND APPARATUS FOR PROCESSING DATABASE UPDATES

(71) Applicant: PERRY + CURRIER INC., Toronto (CA)

(72) Inventors: Christina S. Lee, Toronto (CA); Robert Cotran, Montreal (CA); Robert Shek, Toronto (CA); Thomas Andrew Currier, Toronto (CA)

(73) Assignee: PERRY + CURRIER INC., Toronto (CA)

( * ) Notice: Subject to any disclaimer, the term of this patent is extended or adjusted under 35 U.S.C. 154(b) by 0 days.

(21) Appl. No.: 16/637,338

(22) PCT Filed: Aug. 8, 2018

(86) PCT No.: PCT/IB2018/055981
§ 371 (c)(1),
(2) Date: Feb. 7, 2020

(87) PCT Pub. No.: WO2019/030698
PCT Pub. Date: Feb. 14, 2019

(65) Prior Publication Data
US 2021/0133179 A1 May 6, 2021

Related U.S. Application Data

(60) Provisional application No. 62/542,465, filed on Aug. 8, 2017.

(51) Int. Cl.
*G06F 7/00* (2006.01)
*G06F 17/00* (2019.01)
(Continued)

(52) U.S. Cl.
CPC ........ *G06F 16/2379* (2019.01); *G06F 9/4881* (2013.01); *G06F 16/21* (2019.01); *G06F 16/245* (2019.01)

(58) Field of Classification Search
CPC .. G06F 16/2379; G06F 9/4881; G06F 16/245; G06F 16/21
(Continued)

(56) References Cited

U.S. PATENT DOCUMENTS 5,437,024 A * 7/1995 French ................... G16H 10/60
2002/0078072 A1 6/2002 Tan et al.
(Continued)

FOREIGN PATENT DOCUMENTS

WO 03005158 A2 1/2003

OTHER PUBLICATIONS

ISA/CA, International Search Report and Written Opinion, dated Nov. 16, 2018, re PCT International Patent Application No. PCT/IB2018/055981.

*Primary Examiner* — Tuan A Pham
(74) *Attorney, Agent, or Firm* — Perry + Currier (57) ABSTRACT

A method in job processing server of processing database updates includes: storing, at a job processing server, a job queue including a plurality of job records, each job record having corresponding job parameters; detecting job initiation data at a data source; responsive to detecting the job initiation data, retrieving new job parameters from the data source based on the job initiation data; creating a new job record including the new job parameters in the job queue; and responsive to a predefined trigger, for each job in the job queue, processing the job based on corresponding job parameters, wherein processing the job includes sending instructions for execution by a second server, the instructions for performing an update at the second server.

12 Claims, 8 Drawing Sheets

(51) Int. Cl.
*G06F 16/23* (2019.01)
*G06F 16/21* (2019.01)
*G06F 16/245* (2019.01)
*G06F 9/48* (2006.01)

(58) Field of Classification Search
USPC .......................................................... 707/609
See application file for complete search history.

(56) References Cited

U.S. PATENT DOCUMENTS

| | | | |
|---|---|---|---|
| 2003/0212813 A1 | 11/2003 | Kashyap | |
| 2005/0172054 A1* | 8/2005 | Mathrubutham | G06Q 10/00 710/52 |
| 2007/0216933 A1* | 9/2007 | Hirano | G06F 9/5027 358/1.15 |
| 2009/0177705 A1* | 7/2009 | Meinsen | G06F 16/21 |
| 2010/0309911 A1* | 12/2010 | Eshwar | H04L 12/1859 370/390 |
| 2012/0311377 A1* | 12/2012 | Blood | G06F 11/2097 714/4.12 |
| 2013/0318536 A1* | 11/2013 | Fletcher | G06F 16/334 718/104 |
| 2017/0031723 A1* | 2/2017 | George | G06F 16/252 |

* cited by examiner

METHOD, SYSTEM AND APPARATUS FOR PROCESSING DATABASE UPDATES

CROSS-REFERENCE TO RELATED APPLICATIONS

This application claims priority from U.S. Provisional Patent Application No. 62/542465, filed Aug. 8, 2017, the contents of which is incorporated herein by reference

FIELD

The specification relates generally to database updates, and specifically to a method, system and apparatus for processing database updates.

BACKGROUND

In databases, initial updates to portions of the database may initiate further updates to additional portions of the database. Execution of the initial updates and the further updates can cause the initial updates to be lengthy and time-consuming to complete.

SUMMARY

An aspect of the specification provides a method in job processing server of processing database updates. The method includes: storing, at a job processing server, a job queue including a plurality of job records, each job record having corresponding job parameters; detecting job initiation data at a data source; responsive to detecting the job initiation data, retrieving new job parameters from the data source based on the job initiation data; creating a new job record including the new job parameters in the job queue; and responsive to a predefined trigger, for each job in the job queue, processing the job based on corresponding job parameters, wherein processing the job includes sending instructions for execution by a second server, the instructions for performing an update at the second server.

BRIEF DESCRIPTIONS OF THE DRAWINGS

Embodiments are described with reference to the following figures, in which.

DETAILED DESCRIPTION

Figure 1:
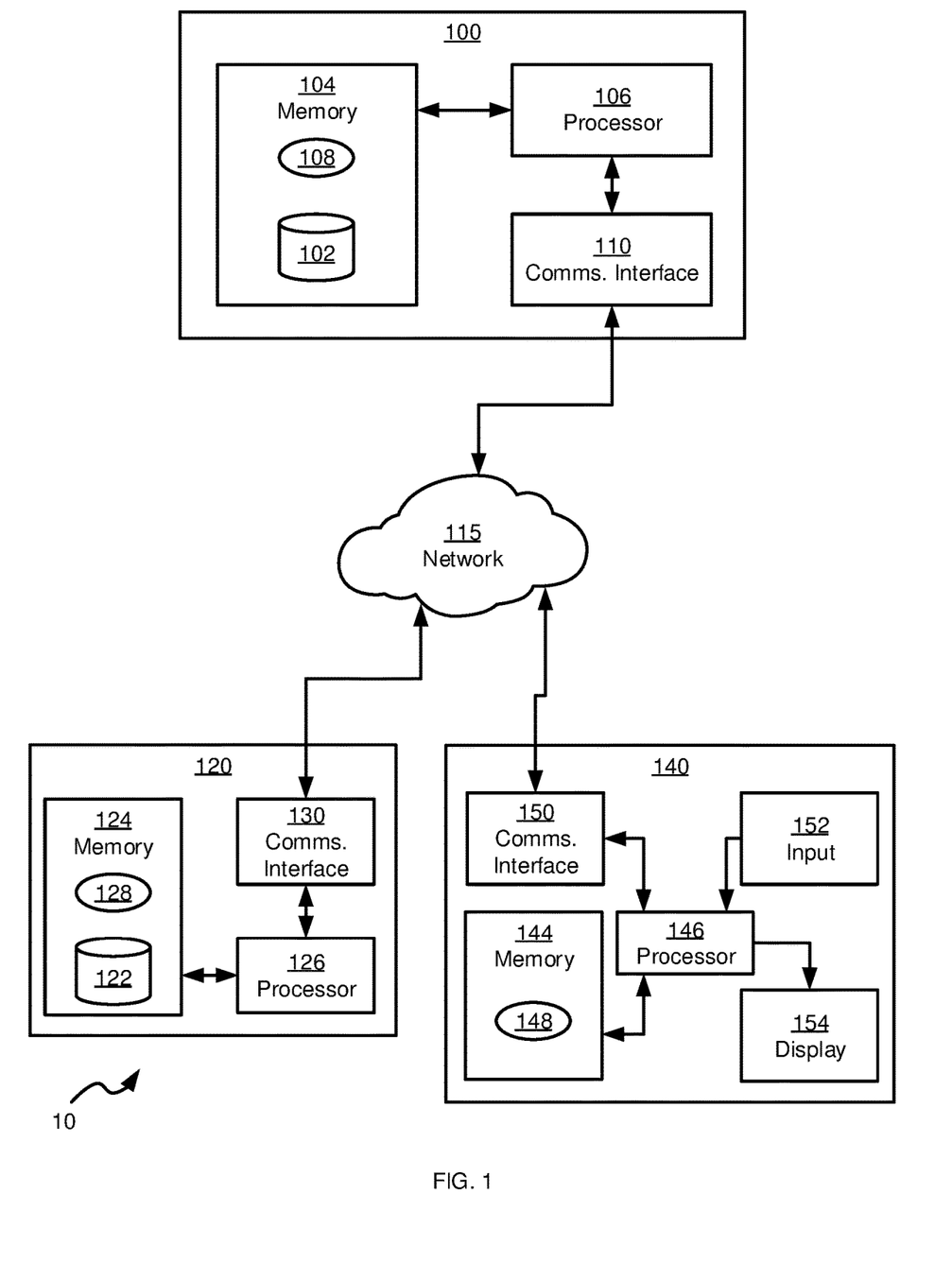
FIG. 1 depicts an example system for processing database updates.

FIG. 1 depicts a system 10 in accordance with the present disclosure. The system 10 includes a job processing server 100 including a processor 106 specifically configured to process database updates. The processor 106 can include a central-processing unit (CPU), a microcontroller, a microprocessor, a processing core, a field-programmable gate array (FPGA), or similar. The processor 106 can include multiple cooperating processors. The processor 106 can cooperate with a non-transitory computer readable medium such as a memory 104 to execute instructions to realize the functionality discussed herein. The memory can include a combination of volatile (e.g. Random Access Memory or RAM) and non-volatile memory (e.g. read only memory or ROM, Electrically Erasable Programmable Read Only memory or EEPROM, flash memory). All or some of the memory 104 can be integrated with the processor 106. The memory 104 stores computer readable instructions for execution by the processor 106.

In particular, the memory 104 also stores a plurality of applications, each including a plurality of computer-readable instructions executable by the processor 106. The execution of the instructions by the processor 106 configures the job processing server 100 to perform various actions discussed herein. The applications stored in the memory 104 include an application 108 which may also be implemented as a suite of logically distinct applications. In general, via execution of the application 108 or subcomponents thereof, the processor 106 is configured to implement various functionalities. The memory 104 also stores a repository 102 containing a job queue. The job queue includes a plurality of job records, each job record having corresponding job parameters. In particular, each job record (also referred to as simply a job) represents a set of instructions for performing an update, as will be described further below. The repository 102 can further contain a job log for tracking completed jobs, incomplete jobs, error reports and the like.

The job processing server 100 is configured to interact with other computing devices via a communications interface 110 connected to a network 115 (e.g. any suitable combination of wired and/or wireless local and wide-area networks, including the Internet). The communications interface 110 thus includes any suitable hardware components (e.g. network interface controllers, transceivers and the like) to connect the job processing server 100 to the network 115.

The system 10 also includes a database server 120 hosting a primary database 122 stored in a non-transitory computer-readable medium such as a memory 124 thereof (e.g. any suitable combination of volatile and non-volatile memory, implemented as one or more integrated circuits, magnetic disks, or the like). The database server 120 includes a processor 126 connected with the memory 124 and configured to execute the computer-readable instructions of an application 128 stored in the memory 124 in order to perform various functions discussed herein, including hosting of the primary database 122 and interacting with other computing devices (including the job processing server 100) via a communications interface 130 connected to the network 115.

The database 122 can contain any of a wide variety of types of data. For example, as will be discussed in greater detail below, the database 122 can contain data defining a plurality of events, such as tasks related to the provision of goods and/or services (e.g. professional services, manufactured goods, or the like). The database 122 may therefore contain records defining the above-mentioned events, including deadlines, personnel assignment, client and/or customer information, and the like.

The primary database 122, in other words, contains records that may be updated periodically to reflect new tasks and to track the progress of previously created tasks. Some of the above-mentioned updates (triggering updates), such as those indicating a particular status of a given task, may prompt additional updates (triggered updates) to other portions of the database 122, or to secondary databases (not shown). For example, a previously created task may indicate a status which requires data verification. The verification of the data (a triggering update) can initiate a related triggered update to copy the verified data to another matter. In particular, the time required to complete the triggering update is increased due to the additional time required to complete the triggered updates, particularly when the triggered update is lengthy and time-consuming. The database server 120 may experience lag and have a lower performance.

In some implementations, the job processing server 100 and the database server 120 may be implemented as a single server.

The system 10 also includes a client device 140 implemented as any suitable one of a mobile device (e.g. a smartphone, a tablet computer, a laptop computer or the like), a desktop computer, and the like. The client device 140 includes a communications interface 150 (e.g. one or more transceivers, NICs, or the like) connecting the client device 140 with the database server 120 via the network 115. The client device 140 also includes a processor 146 interconnected with a non-transitory computer-readable medium such as a memory 144, which stores computer-readable instructions in the form of an application 148 executable by the processor 146. Execution of the application 148 configures the processor 146 to communicate with the database server 120. In the present example, the application 148 is a client docketing application related to the provision of goods and/or services, the execution of which permits the client device 140 to interact with the database server 120 to retrieve data from, and make updates to, the database 122. That is, the database server 120 is configured (e.g. via the execution of the application 128) to implement an interface for interaction between the client device 140 and the database 122. In other examples, the application 148 can be a web browser application, which permits similar interaction between the client device 140 and the primary database 122 via a web-based interface.

The client device 140 is configured to initiate updates to the primary database 122, for example via the receipt of input data at an input device 152 (e.g. a keyboard, touch screen, mouse, or the like) and transmission of updates to the database server 120 via the network 115. Such updates can indicate, for example, changes in the progress of a task (e.g. indicating the completion of a task), the creation of new tasks, and the like. The client device 140 is also configured to retrieve and present, for example via a display 154 or other suitable output device, data from the primary database 122. In particular, the client device 140 can be configured to initiate updates to the primary database 122 which prompt additional triggered updates. For example, in the example given above, the data verification may be performed by an operator. Upon verifying the data, the operator may change the progress of the task (e.g. by adding an event to the matter) via the client device 140 to indicate that the data has been verified. The change in progress can then initiate the related triggered update to copy the verified data to another matter. As noted above, the completion of the triggering update (i.e. changing the progress of the task to indicate data is verified) may be delayed based on the triggered update (i.e. copying the verified data to another matter).

The job processing server 100, as will be discussed in greater detail below, is therefore configured to detect triggering updates at the primary database 122, and in response create a job record in the job queue. In particular, each job record represents a triggered update. The job processing server 100 is subsequently configured to execute each job in the job queue in response to a separate predefined trigger, allowing the triggered updates to be completed separate from the triggering updates. The time required to complete the triggering update is thus reduced, and performance of the primary server 120 is increased.

Figure 2:
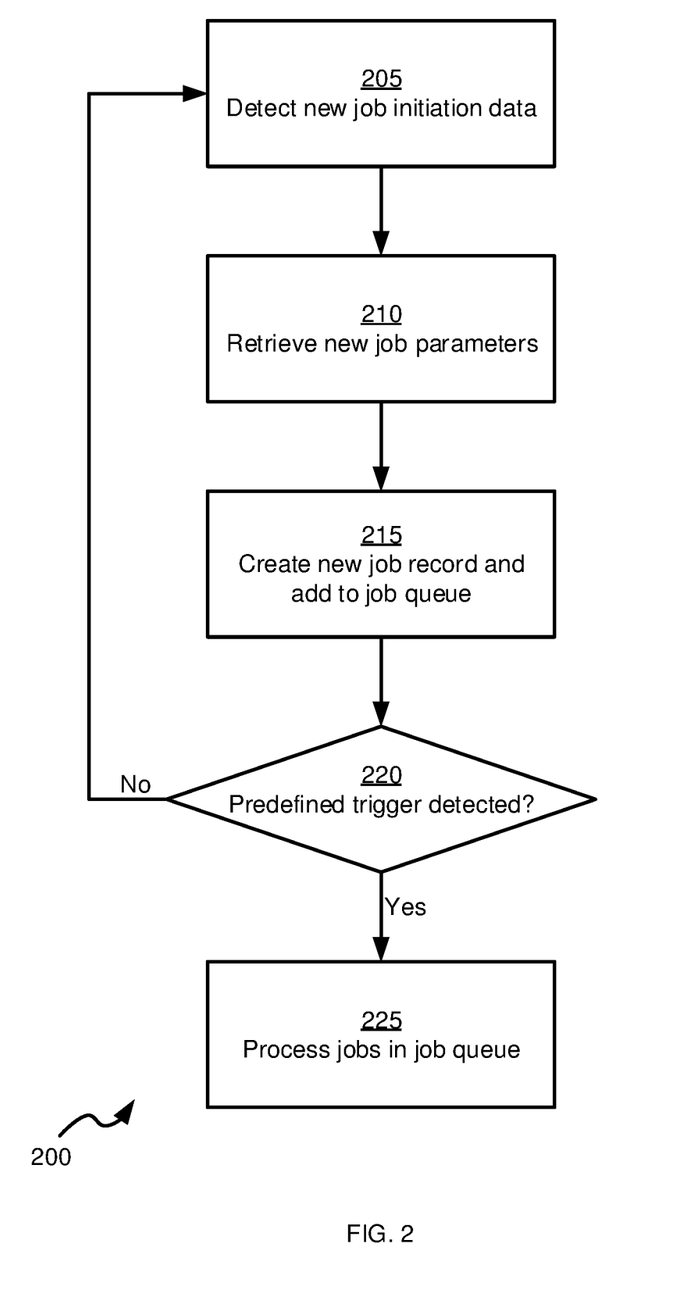
FIG. 2 depicts a method for processing database updates in the system of FIG. 1.

Turning now to FIG. 2, the operation of system 10 will be described in greater detail. Specifically, FIG. 2 illustrates a method 200 of processing database updates. The method 200 will be described in conjunction with its performance within the system 10, and particularly by the job processing server 100, via the execution of the application 108.

At block 205, the server 100 is configured to detect job initiation data in the database 102. For example, the server 100 may periodically query the database server 120 for job initiation data in the database 122. The job initiation data may be defined, for example, by a set of criteria specified in the application 108. The job initiation data may be based on database updates received via the client device 140 (e.g. triggering updates). For example, the addition of the particular event indicating that data has been verified (e.g. based on a predefined event ID) to the database 122 can act as job initiation data. In other examples, job initiation data may be based on other databased updates, for example, as entered by the processor 106 as a result of the execution of a job or other automated process. In further examples, the new job initiation data may be detected at or received from a secondary data source (e.g. another server or the like).

In other examples, the database 122 can include database trigger procedures associated with database tables. The database trigger procedures are executable by the processor 126 when specific, predefined updates (e.g. the addition of new records with specific parameters, or the modification of existing records to meet the specific parameters) are detected. The database trigger procedures may configure the database server 120 to communicate with the job processing server 100 to provide instructions for populating the job queue. These instructions may therefore serve as the job initiation data.

At block 210, the server 100 is configured to retrieve new job parameters based on the job initiation data. In other words, the server 100 is configured to retrieve the parameters required to execute the job. The new job parameters retrieved at block 210 can be defined for example, by a set of criteria specified in the application 108 or by a job definition look-up table in the repository 102. In particular, the application 108 may specify a relationship indicating that a certain event ID detected as job initiation data corresponds to a certain job type requiring certain job parameters. For example, an event ID representing a task to obtain data may correspond to a job type to obtain data, which in turn requires job parameters such as an access mechanism and field identifiers to determine what data to obtain. For example, the criteria can include field identifiers to be directly retrieved from the database 122, such as a matter ID, an application number, and the like. The criteria can define static job parameters, such as a website uniform resource locator (URL). The criteria can also include a determination of the job parameter based on the job initiation data and/or based on other job parameters. For example, the job parameter may vary based on the country of the matter ID, the event ID of the job initiation data, or the like.

At block 215, the server 100 is configured to create a new job record having the job parameters retrieved at block 210 and add the new job record to the job queue in the repository 102. Table 1 illustrates an example job queue, where each line represents a job record including the job parameters for executing the job.

TABLE 1

| Job Queue | | |
| --- | --- | --- |
| Job Type | Case ID | Other Parameters |
| Select Complexity Tier | P1234US00 | High Complexity |
| Copy Records | P4321CA00 | |
| Obtain Data | P5678CA00 | www.patents.com/app-no-1234567 |

In the example above, each job includes a job type corresponding to the type of job to be executed, a project identifier (also referred to as a case identifier, matter identifier, or the like) corresponding to a given good or service, or to a related set of goods or services (e.g. the filing and prosecution of one patent application for a particular customer), and other parameters for executing the job. In some examples, additional parameters may be selected according to a predefined format based on the job type, to allow the job processing server 100 to handle multiple additional parameters. Each job can include various other data, not shown above for simplicity of illustration. Such other data can include a unique job identifier (e.g. a database key) distinguishing the particular job from other jobs, the job initiation data, a time stamp indicating the time and date of creation of the job in the job queue, and the like.

At block 220, the server 100 is configured to determine whether a predefined trigger has been detected. For example, the predefined trigger may be certain times of the day (e.g. every five minutes, every hour, or the like). In other examples, the predefined trigger can be based on a job queue timer. For example, the addition of a new job to the job queue can, in turn, initiate the job queue timer to track a predefined length of time (e.g. a countdown from five minutes). The predefined trigger can therefore include the time on the timer elapsing. In some examples, the addition of a new job to the job queue when the timer is running can re-initiate the timer (e.g. reset the timer to five minutes), while in other examples, the addition of a new job to the job queue when the timer is running may not affect the timer. In further examples, the predefined trigger may be based on operator input received via the client device 140.

As will now be apparent to a person of skill in the art, the detection of the predefined trigger at block 220 need not immediately follow the performance of block 215. For example, numerous instances of blocks 205-215 may be performed to add numerous jobs to the job queue before the predefined trigger is detected. In other examples, the predefined trigger may be detected prior to any jobs being added to the job queue (e.g. after all the jobs have been completed).

At block 225, responsive to the predefined trigger being detected, the server 100 is configured to process the jobs in the job queue. In particular, for each job, the server 100 is configured to send instructions for execution to the database server 120, the instructions for performing an update at the database server 120. For example, the update may include updating the database 122. In other examples, the server 100 is configured to send instructions for execution by a secondary server (i.e. a server other than the database server 120) for performing an update at the secondary server.

In some implementations, the job queue may contain a cursor indicating a current job record. To process the jobs in the job queue, the server 100 is configured process the current job record, then move the cursor to the next record. The server 100 thus iterates through each job in the job queue until the cursor indicates a blank record or a stop line. The server 100 may then reset the cursor to a starting line.

Processing each job can further include receiving, at the job processing server 100, a status indicator from the database server 120 (or other secondary server) indicating a status of the update. For example, the status can indicate that the update was successful or that an error occurred (i.e. the update failed).

Responsive to receiving the status indicator, the job processing server 100 can be configured to remove the job from the job queue. In some implementations, the job is only removed from the job queue upon successful completion of the job. Failed jobs may thus be repeated upon a subsequent detection of the predefined trigger. The job records may therefore also contain a counter indicating the number of attempts at processing the job; upon reaching a threshold count, a notification (e.g. an email or the like) may be generated for transmission to an operator, and the job removed from the job queue. In other implementations, the job is removed from the job queue both in cases of success and in cases of failure. A notification may also be generated for transmission to an operator. In some examples, errors handling processes may be included as part of the instructions and may be handled by the database server 120. The status indicator may therefore be a completion indicator, regardless of success or failure. The job processing server 100 may simply remove the job from the job queue responsive to receiving the completion indicator.

Processing each job may further include generating a log line in the job log. The log line can include, for example, a job identifier, the job parameters, the status indicator, a date of completion of the job and the like.

Figure 3:
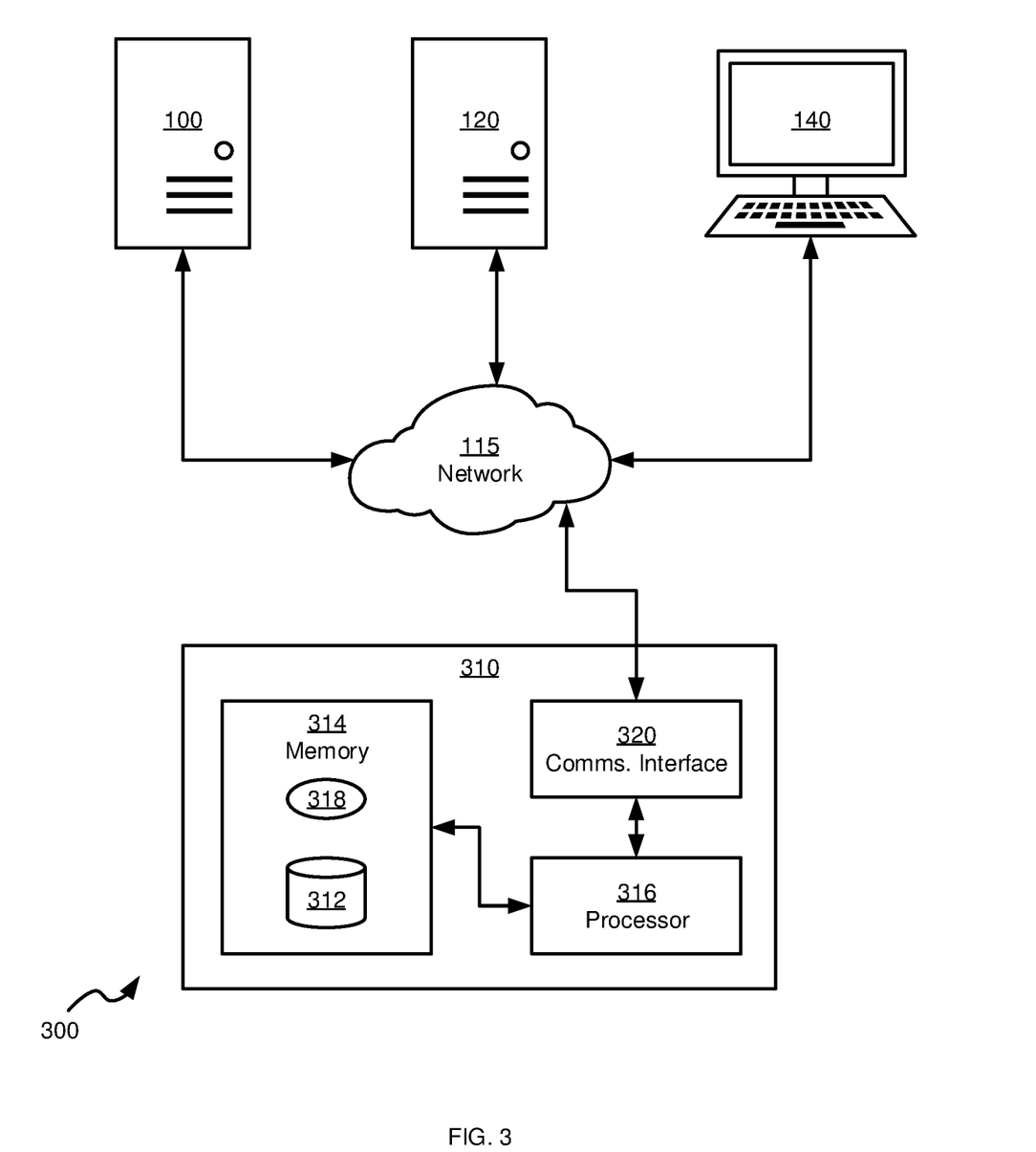
FIG. 3 depicts a further example system for processing database updates.

FIG. 3 depicts an example system 300 for obtaining information from an external source via processing of a job by the job processing server 100. The example system 300 includes the job processing server 100 interconnected with the database server 120 and the client device 140 via the network 115. The system 300 also includes an external server 310 interconnected with the server 100 via the network 115.

The external server 310 hosts an external database 312 stored in a non-transitory computer-readable medium such as a memory 314 thereof (e.g. any suitable combination of volatile and non-volatile memory, implemented as one or more integrated circuits, magnetic disks, or the like). The external server 310 includes a processor 316 connected with the memory 314 and configured to execute the computer-readable instructions of an application 318 stored in the memory 314 in order to perform various functions discussed herein, including hosting of the external database 312 and interacting with other computing devices (including the server 100) via a communications interface 320 connected to the network 115.

The external database 312 can contain any of a wide variety of types of data. In general, the external database 312 contains data associated with the data stored in the primary database 122. In the example discussed below, the database 122 contains data relating to the filing and prosecution of a patent application for a client, and the external database 31 contains data relating to the same patent application, for example, as recorded by a governing body (e.g. a national intellectual property office) or based on publicly available data gathered by a third party (e.g. a data collection agency). For example, the external database 312 can contain records defining application numbers, relevant dates, documents sent and received, status (e.g. in good standing, abandoned), and the like. Other examples of primary databases and related external databases will also occur to those skilled in the art.

The data contained in the external database 312 may be accessed, for example by the server 120 or other computing device, via an application program interface (API) allowing access to the raw data in the database 312. In other examples, the data may be accessed via a web browser application, and the server 120 or other computing device can be configured to "scrape" the data from the web page. In other words, the server 120 can be configured to parse the web page (e.g. the HTML encoding the web page) for the relevant data. The data obtained from the external database 312 can be used, for example, to verify or populate data in the database 122.

In particular, obtaining data from the external database 312 may be performed by processing a job initiated by the method 200. The method 200, in turn, is initiated upon detection of job initiation data by the processor 106. For example, a new matter may be opened in relation to a patent application file transferred from another patent firm. The job initiation data may therefore be an event representing a task to obtain data from the corresponding national intellectual property office and populate the matter in the database 122. In other examples, a new matter may be opened in relation to a patent application based on a parent application. The job initiation data may therefore be an event representing a task to obtain data relating to the parent application and populate the parent application data in the database 122. In further examples, the progress of a task may be updated to indicate that a document was filed, for example via an online filing system. The job initiation data may therefore be an event representing a task to verify the document in the online filing system. In some examples, the event may be added via input by an operator at the client device 140, or by the processing of a job or other automated process (e.g. an automated file transfer process or the like). Other examples of database updates prompting a further action to obtain data from an external source will also occur to those skilled in the art.

At block 210, the processor 106 retrieves job parameters based on the job initiation data. Table 2 illustrates example sets of job parameters which may be retrieved at block 210.

TABLE 2

Job Parameters for Obtaining Data

| Event ID | Matter ID | Identifier | Job Type | Action Type | Access |
|---|---|---|---|---|---|
| 100 | P1234CA00 | 1234567 | Obtain Data | Populate | www.can-pats.ca/app-no-1234567 |
| 100 | P1234EP00 | 112233.1 | Obtain Data | Populate | www.ep-pats.org/app-no-1122331 |
| 110 | P1234US00 | 18/123456 | Obtain Data | Verify | API access instructions |
| 120 | P1234CA00 | 1234567 | Obtain Data | Populate | www.can-pats.ca/reg-no-1234567 |

In the example above, each set of job parameters includes an event identifier (i.e. representing the task for obtaining data from an external source) which corresponds to the job initiation data. Each set of job parameters also includes a project identifier (e.g. case identifier, matter identifier, or the like), which distinguishes the matter within the database 122, and a unique identifier (e.g. an application number, registration number, or the like), which distinguishes and relates the matter between the databases 122 and 312. Each set of job parameters also includes a job type (e.g. a text string or other identifier) corresponding to the type of job to be executed, and an action type representing the type of action to be taken. Each set of parameters also includes access information identifying an access mechanism (e.g. a URL, API access instructions, or the like) to obtain data from the external database 312. Each set of job parameters can include various other data, not shown above for simplicity of illustration.

In particular, in the example above, each of the job initiation data (i.e. the addition of event IDs 100, 110, or 120 to a matter) initiates a job to obtain data from an external source (i.e. the job type "Obtain Data"). Other job parameters, such as action type and the access information may vary, for example, based on the specific event ID or based on the properties (e.g. country) of the matter.

At block 215, the server 100 is configured to create a new job record for obtaining data from an external source and add the job to the job queue.

Figure 4:
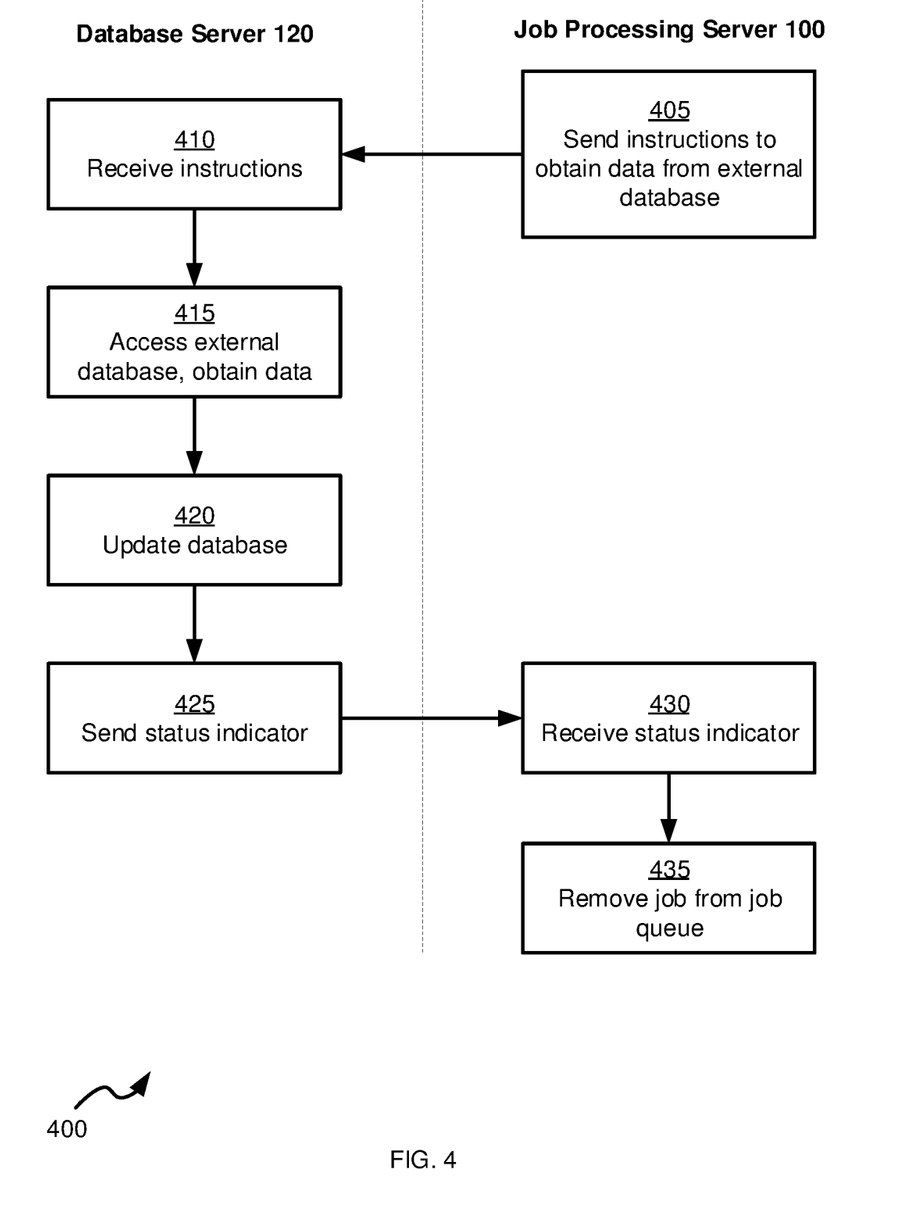
FIG. 4 depicts a method for processing a job in the system of FIG. 3.

FIG. 4 depicts a method 400 for processing a job to obtain information from the external database 312. The method 400 will be described in conjunction with its performance within the system 300, and particularly by the job processing server 100 and the database server 120. In particular, the method 400 is initiated upon detection of the predefined trigger, as the job processing server 100 is iterating through processing jobs in the job queue.

At block 405, the server 100 sends instructions for obtaining data from the external database to the database server 120, for example via the network 115. In particular, the instructions include job parameters stored in the job queue, including, but not limited to, the access mechanism to access the external database 312, the unique identifier to uniquely identify the matter in the external database 312, and a set of criteria defining, for example, fields to obtain from the external database 312.

At block 410, the database server 120 receives the instructions from the job processing server 100.

At block 415, the database server 120 is configured to access the external database 312 using the access mechanism specified in the instructions received at block 410. For example, the database server 120 may be configured, via execution of the instructions, to access the web page given by the access mechanism. In other implementations, accessing the external database 312 may further include provisioning login information or an access code (e.g. to access a private database). The database server 120 is then configured to obtain data from the external database 312. For example, the database server may first find the record in the external database having the unique identifier specified in the instructions. In some implementations, access mechanism specified in the instructions may be directed to the uniquely identified record. In other implementations, the database server 120 is configured, to locate a portion of the external database 312 relating to the uniquely identified record. The instructions received at block 410 may include criteria specifying fields or data values to obtain. The database server 120 may be configured to obtain the data, for example by parsing the web page and locating field identifiers.

At block 420, the database server 120 updates the database 122 based on the data obtained at block 425. In some examples, the updates can include populating fields in the database 122 with values obtained for corresponding fields from the database 312. The populating of fields in the database 122 may also prompt the addition of additional tasks to the database 312. In other examples, the database server 120 may verify the data in the database 122 against the data obtained from the database 312, and generate a notification indicating the results of the comparison. The database server 120 can further be configured to change the status of a task (e.g. by adding or removing an event) to indicate that the data has been obtained.

In some examples, if the data was not obtained successfully (e.g. a portion of the data was unavailable, the external database 312 could not be accessed, the record could not be found or the like), then the database server 120 may be further configured, at block 430, to execute an error handling process. For example, the database server 120 may generate a notification for transmission to an operator and may not change the status of the task to indicate that the data has been obtained. In other examples, the database server 120 may be configured to proceed to block 435 to send a failure indicator to the job processing server 100 for error handling.

At block 435, the database server 120 sends a status indicator to the job processing server 100, for example via the network 115. For example, the status indicator may be a success/failure indicator, or it may simply be a completion indicator.

At block 440, the job processing server 100 receives the status indicator from the database server 120.

At block 445, in response to the receipt of the status indicator, the job processing server 100 removes the job from the job queue. The job processing server 100 can also be configured, at block 450, to log the completed job in the job log. In some examples, in response to receipt of a failed status indicator at block 440, the job processing server 100 can be configured to handle errors. For example, the job processing server 100 may generate a notification for transmission to an operator and remove the job from the job queue. In other examples, the job processing server 100 may increment a counter on the job rather than removing it to allow the job to be reprocessed at a subsequent detection of the predefined trigger.

Figure 5:
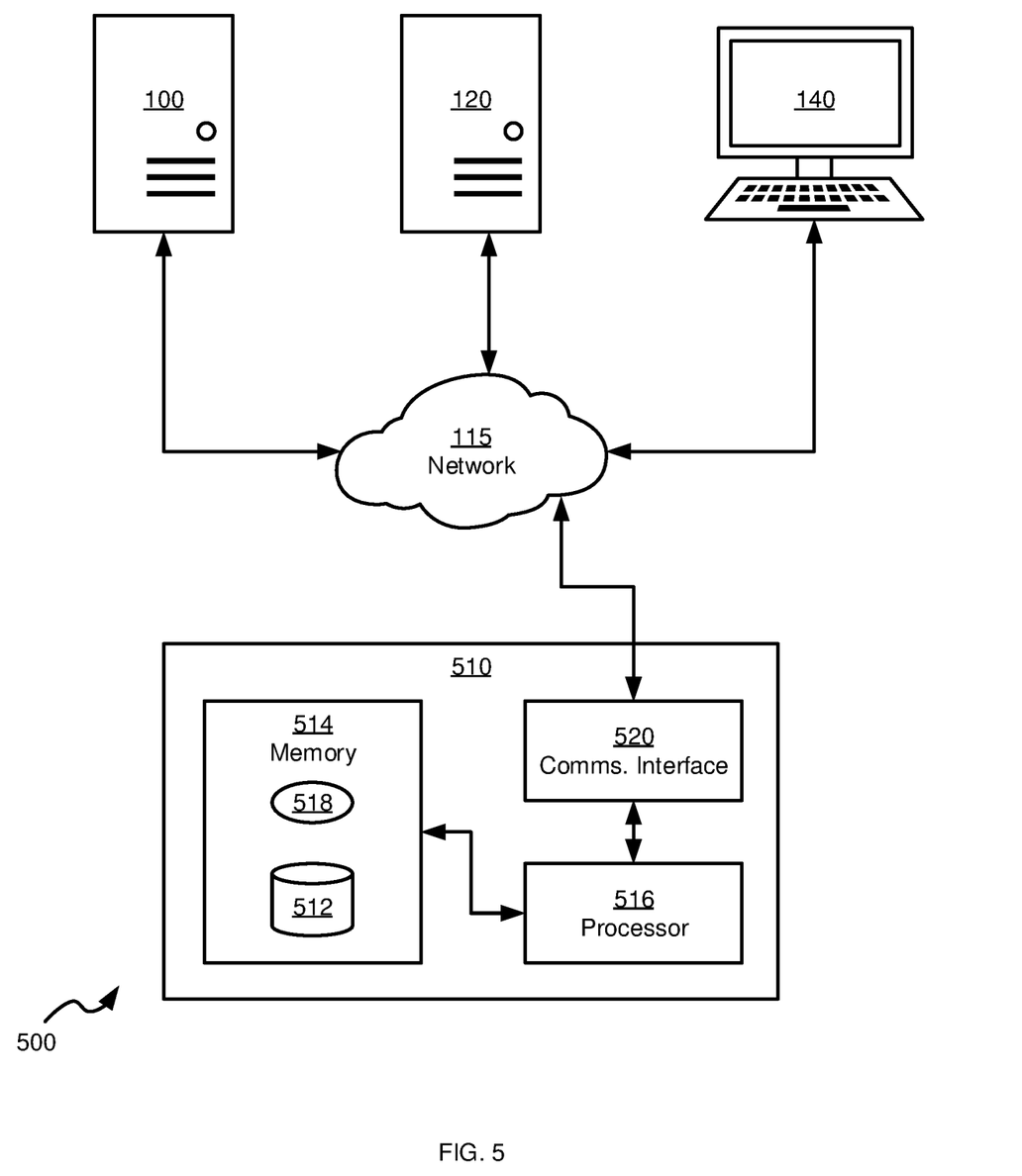
FIG. 5 depicts a further example system for processing database updates.

FIG. 5 depicts an example system 500 for receiving and processing an inbound document using a document processing server. The system 500 includes the job processing server 100 interconnected with the database server 120 and the client device 140 via the network 115. The system 300 also includes a document processing server 510 interconnected with the server 100 via the network 115.

The document processing server 510 hosts a document repository 512 stored in a non-transitory computer-readable medium such as a memory 514 thereof (e.g. any suitable combination of volatile and non-volatile memory, implemented as one or more integrated circuits, magnetic disks, or the like). The external server 510 includes a processor 516 connected with the memory 514 and configured to execute the computer-readable instructions of an application 518 stored in the memory 514 in order to perform various functions discussed herein, including hosting of the document repository 512 and interacting with other computing devices (including the server 120) via a communications interface 520 connected to the network 115.

In general, the document repository 512 contains documents for processing by the document processing server 510 and for transmission to the primary server 120. In the example discussed below, the database 122 contains data relating to the filing and prosecution of a patent application for a client, and the repository 512 contains documents relating to the patent applications, for example, as received from a governing body (e.g. a national intellectual property office) or another source. For example, the document repository 512 can contain filing receipts, issue notifications, and the like. Other examples of primary databases and related external databases will also occur to those skilled in the art.

In particular, an inbound document is received at the document processing server 510. The inbound document may be stored, for example, in the document repository 512. The document processing server 510 is configured to process the inbound document, for example, via execution of the application 518 by the processor 516. In particular, the document processing server 510 generates an intermediate document. The intermediate document may also be stored in the document repository 512. For example, the inbound document may be a portable document format (PDF) file and the document processing server 510 may be configured to perform optical character recognition (OCR) and output a computer-readable version as the intermediate document. In other examples, the inbound document may be a document having a predefined format and the document processing server 510 may be configured to retrieve particular fields in the document (e.g. based on the predefined format or based on pattern recognition model or the like) and output the fields and the field values as the intermediate document.

The intermediate document is then received by the database server 120. The database server 120 is configured to process the intermediate document, for example via execution of the application 128 via the processor 126. In particular, the database server 120 is configured to update the database 122 based on the intermediate document. For example, the database server 120 may verify and/or populate data from the intermediate document to the database 122. In other examples, the database 120 may retrieve the inbound document from the document processing server 510 to store at the database 122. The database server 120 can additionally generate an event representing a task for an operator to review the updates to the database 122. In some examples, the database server 120 may only generate an event representing a task for an operator to review upon detection of an error during the processing of the intermediate document (e.g. when a comparison to verify a field in the intermediate document does not match the corresponding field value in the database 122).

Upon reviewing the updates to the database 122, the intermediate document, and the inbound document, an operator may detect an error. For example, an operator may detect an error in processing the inbound document to generate the intermediate document (e.g. an OCR error, a missing field, or the like). In other examples, the operator may detect an error in processing the intermediate document to update the database 122 (e.g. a failed verification due to an incorrect data value in the database 122). In further examples, the operator may detect an error in the inbound correspondence itself, or the operator may not detect any errors. After reviewing the updates to the database 122, the operator may add a task based on the review (e.g. to correct an error in processing at the document processing server 510, to correct an error in processing at the database server 120, or to do nothing) via the input device 152. In particular, the job processing server 100 may detect the task as job initiation data, thus initiating the method 200.

At block 210, the processor 106 retrieves job parameters based on the job initiation data. Table 3 illustrates example sets of job parameters pertaining to document processing which may be retrieved at block 210.

TABLE 3

Job Parameters for Document Processing

| Event ID | Matter ID | Job Type | Action Type |
| --- | --- | --- | --- |
| 200 | P1234CA00 | Doc Processing | Reprocess inbound correspondence |
| 210 | P1235CA00 | Doc Processing | Reprocess intermediate correspondence |
| 220 | P1236CA00 | Doc Processing | Log inbound correspondence |

In the example above, each set of job parameters includes an event identifier (i.e. representing the task for obtaining data from an external source) which corresponds to the job initiation data. Each set of job parameters also includes a project identifier (e.g. case identifier, matter identifier, or the like), which distinguishes the matter within the database 122. Each set of job parameters also includes a job type (e.g. a text string or other identifier) corresponding to the type of job to be executed, and an action type representing the type of action to be taken. Each set of job parameters can include various other data, not shown above for simplicity of illustration. In particular, in the example above, each of the job initiation data (i.e. the addition of event IDs 200, 210, or 220 to a matter) initiates a job to process documents. Other job parameters, such as action type may vary, for example, based on the specific event ID.

At block 215, the server 100 is configured to create a new job record for processing the document and add the job to the job queue.

Figure 6:
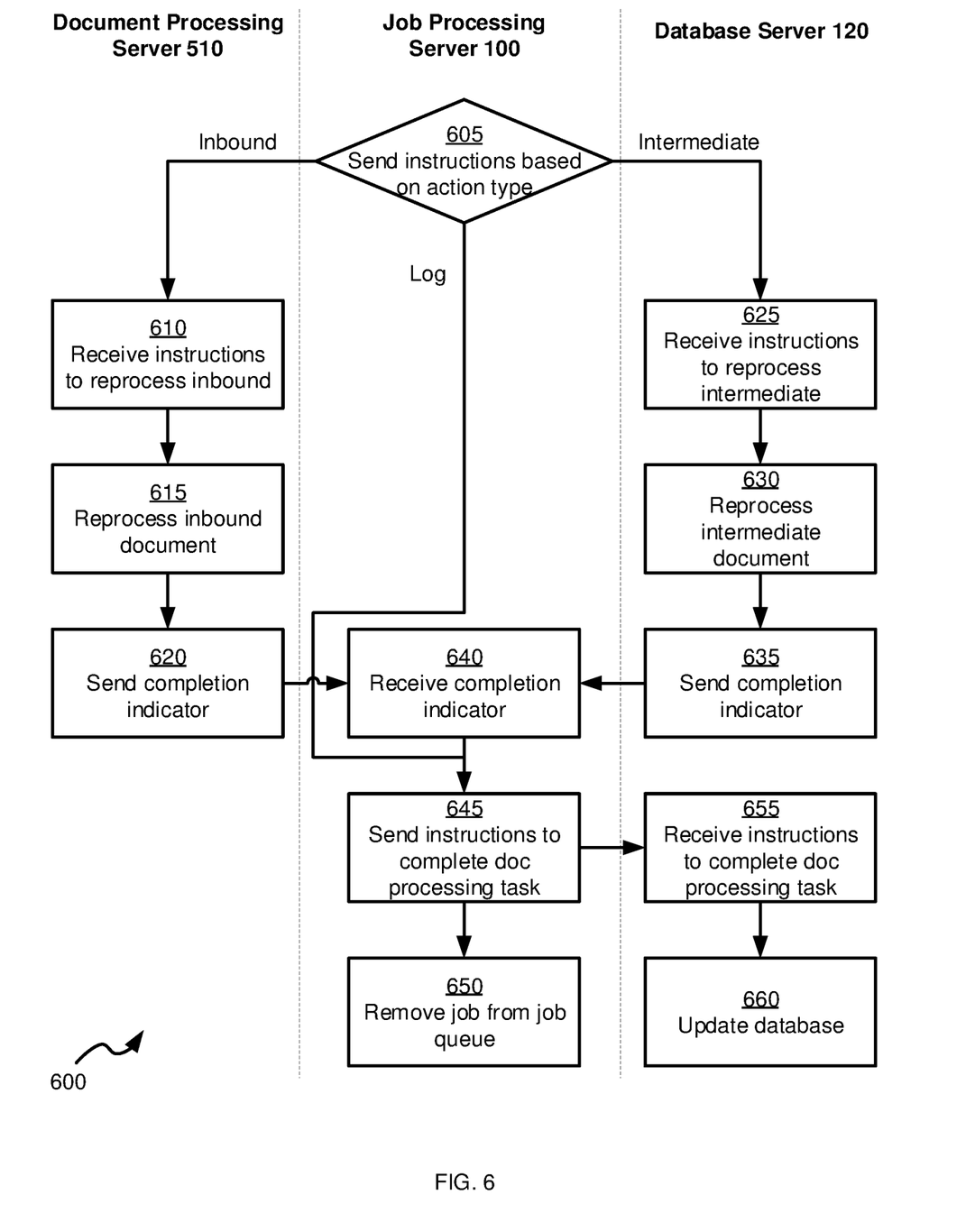
FIG. 6 depicts a method for processing a job in the system of FIG. 5.

FIG. 6 depicts a method 600 for processing a job to complete the processing of an inbound document. The method 600 will be described in conjunction with its performance within the system 500, and particularly, by the job processing server 100, the database server 120, and the document processing server 510. In particular, the method 600 is initiated upon detection of the predefined trigger, as the job processing server 100 is iterating through processing jobs in the job queue.

At block 605, the server 100 sends instructions for completing the processing of the inbound document based on the action type.

If at block 605, the action type is "Reprocess inbound correspondence," the server 100 sends instructions for reprocessing the inbound document to the document processing server 510, for example via the network 115. In particular, the instructions include job parameters stored in the job queue, including, but not limited to the matter ID and an inbound document identifier. The method 600 then proceeds to block 610 at the document processing server 510.

At block 610, the document processing server 510 receives the instructions from the job processing server 100.

At block 615, the document processing server 510 is configured to reprocess the inbound correspondence, for example by execution of the application 518 by the processor 516. In some implementations, processing and/or reprocessing the inbound correspondence may further include operator input to assist in the correction of errors during reprocessing. For example, an operator may verify the OCR of the inbound document during reprocessing. In other implementations, the instructions may include error indicators (e.g. as relayed via the job parameters) to assist in the correction of errors during reprocessing.

At block 620, upon completion of the reprocessing, the document processing server 510 is configured to send a completion indicator to the job processing server 100. In particular, the completion indicator merely indicates the completion of the reprocessing of the inbound document, and does not necessarily indicate the correction of the error. For example, the reprocessing of the inbound document may introduce a different error, which in turn, initiates a further job to complete the processing of the inbound correspondence (i.e. initiates a further instance of the method 600). The method 600 then proceeds to block 640 at the job processing server 100.

Returning to block 605, if at block 605, the action type is "Reprocess intermediate correspondence," the server 100 sends instructions for reprocessing the intermediate document to the database server 120, for example via the network 115. In particular, the instructions include job parameters stored in the job queue such as the matter ID and an intermediate document identifier. The method 600 then proceeds to block 625 at the database server 120.

At block 625, the database server 120 receives the instructions from the job processing server 100.

At block 630, the database server is configured to reprocess the intermediate correspondence, for example via execution of the application 128 by the processor 126.

At block 635, upon completion of the reprocessing, the database server 120 is configured to send a completion indicator to the job processing server 100. In particular, the completion indicator merely indicates the completion of the reprocessing of the intermediate document, and does not necessarily indicate the correction of the error. For example, if a verification process against the intermediate document initially revealed two errors in the database 122, and only one was corrected, reprocessing the intermediate correspondence may re-identify the initial uncorrected error. The method 600 then proceeds to block 640 at the job processing server 100.

At block 640, the job processing server 100 receives the completion indicator from the document processing server 510 or from the database server 120.

Returning again to block 605, if at block 605, the action type is "Log," the server 100 is configured to proceed to directly block 645.

At block 645, the job processing server 100 is configured to send instructions to indicate that the document processing task is complete.

At block 650, the job processing server 100 removes the job from the job queue. The job processing server 100 can also be configured, at block 650, to log the completed job in the job log.

At block 655, the database server 120 receives the instructions to indicate that the document processing task is complete.

At block 660, the database server 120 updates the database based on the instructions received at block 655. For example, when the action type is "Log," the updates can include logging the inbound document in the database 122. The updates can further include generating a notification (e.g. an email or an event in the database 122) indicating the status (e.g. successful log, or an indication of an error in the inbound document). The updates can also include populating data based on the intermediate correspondence, and changing the status of a task (e.g. by adding or removing an event) to indicate that the document processing task is complete. Other examples of suitable updates to the database 122 will also occur to those skilled in the art.

Figure 7:
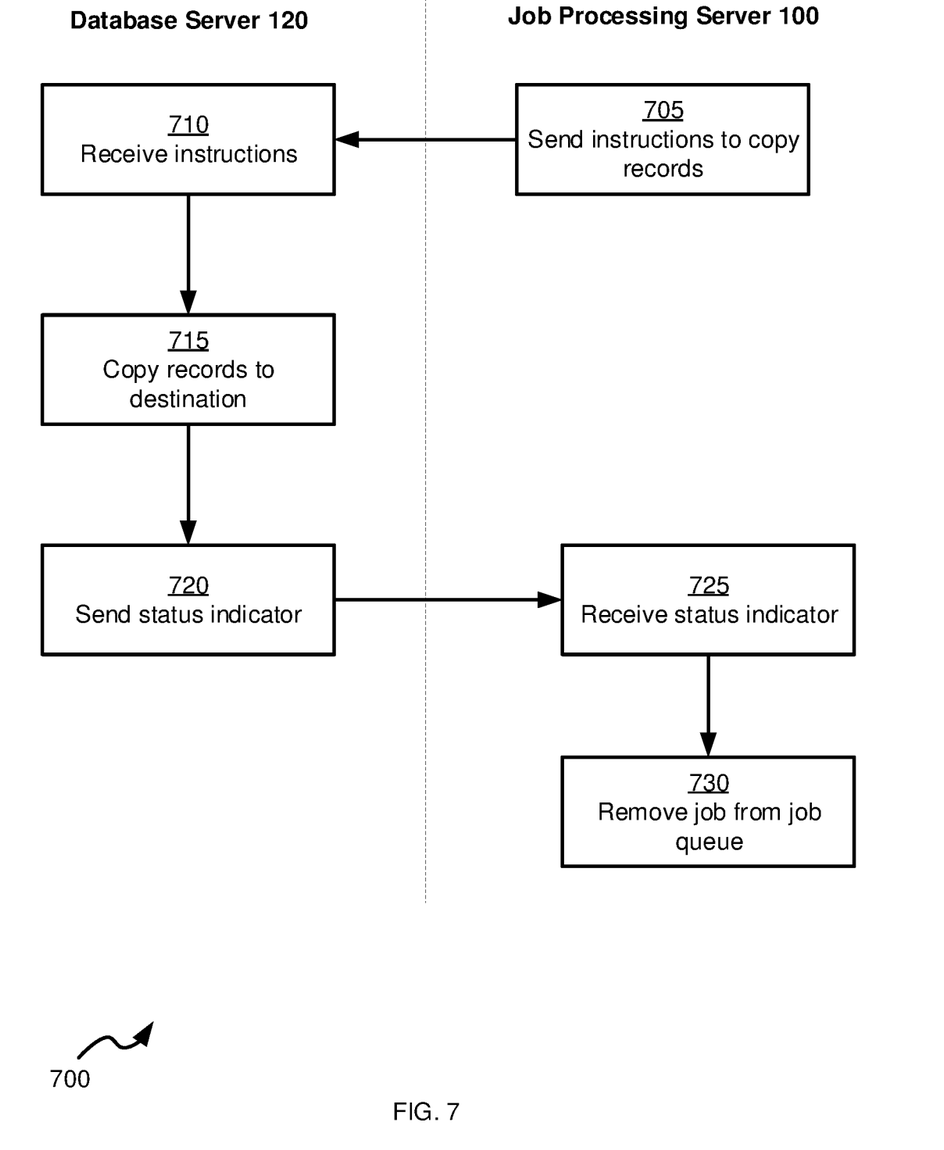
FIG. 7 depicts a method for processing a job in the system of FIG. 1.

FIG. 7 depicts a method 700 for processing a job to copy data from one portion of the database 122 to another portion of the database 122. The method 700 will be described in conjunction with its performance within the system 10, and particularly by the job processing server and the database server 120.

Prior to the method 700, at block 205 of the method 200, the server 100 detects job initiation data at the database server 120. For example, the job initiation data can be a task indicating data is to be copied from one portion of the database 122 (a source portion or matter) to another portion of the database (a destination portion or matter). For example, the task may be added after an operator has verified the integrity of the records associated with the source matter (e.g. to ensure the records are formatted according to certain specifications). In other examples, the job initiation data can be new data or records are added to certain fields the source matter, for example as specified by criteria in the application 108.

At block 210 of the method 200, the server 100 retrieves job parameters from the source matter. The job parameters can include a matter identifier corresponding to the source matter from which records or data are to be copied. The job may specify instructions to run a comparison to evaluate all the records associated with the source matter and the destination matter(s) to determine which records to copy. For example, the job may synchronize the destination matter with the source matter at each instance of the job. In other examples, the job parameters can include identifiers specifically indicating which records to copy to reduce the operational burden of copying and/or evaluating all records associated with the source matter.

At block 215, the server 100 creates a new job and adds the job to the job queue.

Upon detection of the predefined trigger at 220, the job processing server 100 processes the jobs in the job queue, thereby initiating the method 700.

At block 705, the server 100 sends instructions to copy records in the database server 120, for example via the network 115. In particular, the instructions include job parameters stored in the job queue, including, but not limited to, a source in the database 122 (e.g. a matter ID or the like) from which the records are to be copied, and a set of criteria defining, for example, which records are to be copied, as well as their destinations in the database 122.

At block 710, the database server 120 receives the instructions from the job processing server 100.

At block 715, the database server 120 is configured to copy records to the destination. For example, the database server 120 may first identify the destination portions of the database 122, for example, based on the set of criteria specified in the instructions received at block 710. For example, the destinations may be matters related to the source (e.g. related patent applications filed in different countries). The database server 120 is then configured to determine which records to copy. For example, the database server 120 may compare records between the source matter and the destination matter to identify records missing from the destination matter (i.e. records associated with the source matter, but not associated with the destination matter). For example, each record may include a unique record ID (e.g. a database key) or may otherwise be uniquely identifiable (e.g. based on a combination of an application number and a country code). In some implementations, each record associated with the source matter may be compared to the destination matter. In other words, all the records in the source matter are compared. In other implementations, the instructions received at block 710 may specify a specific record or records to for comparing and copying to the destination matter.

The database server 120 is then configured to copy the missing records to the destination. In particular, the instructions may specify portions of the records to copy (e.g. the uniquely identifying portions or other static data). Variable data relating to the records, such as a log date, a viewed date, a status (e.g. reviewed, new) or the like may be set according to criteria specified in the instructions. For example, the log date may be set to the date the job is executed, the viewed date may be blank, and the status may default to "new." In some implementations, the database server 120 is further configured to update further portions of the database, for example to add an event to the destination matter indicating that a record was copied. The database server 120 may additionally update the status of a task at the source matter to indicate that the records have been copied.

In the present example, if the copy was not successful, then the database server 120 may be further configured, at block 715, to execute an error handling process (e.g. generating a notification for transmission to an operator). In other examples, the database server 120 may be configured to proceed to block 730 to send a failure indicator to the job processing server 100 for error handling.

At block 720, the database server 120 sends a status indicator to the job processing server 100, for example via the network 115. For example, the status indicator may be a success/failure indicator, or it may simply be a completion indicator.

At block 725, the job processing server 100 receives the status indicator from the database server 120.

At block 730, in response to the receipt of the status indicator, the job processing server 100 removes the job from the job queue. The job processing server 100 can also be configured, at block 730, to log the completed job in the job log. In some examples, in response to receipt of a failed status indicator at block 725, the job processing server 100 can be configured to handle errors.

Figure 8:
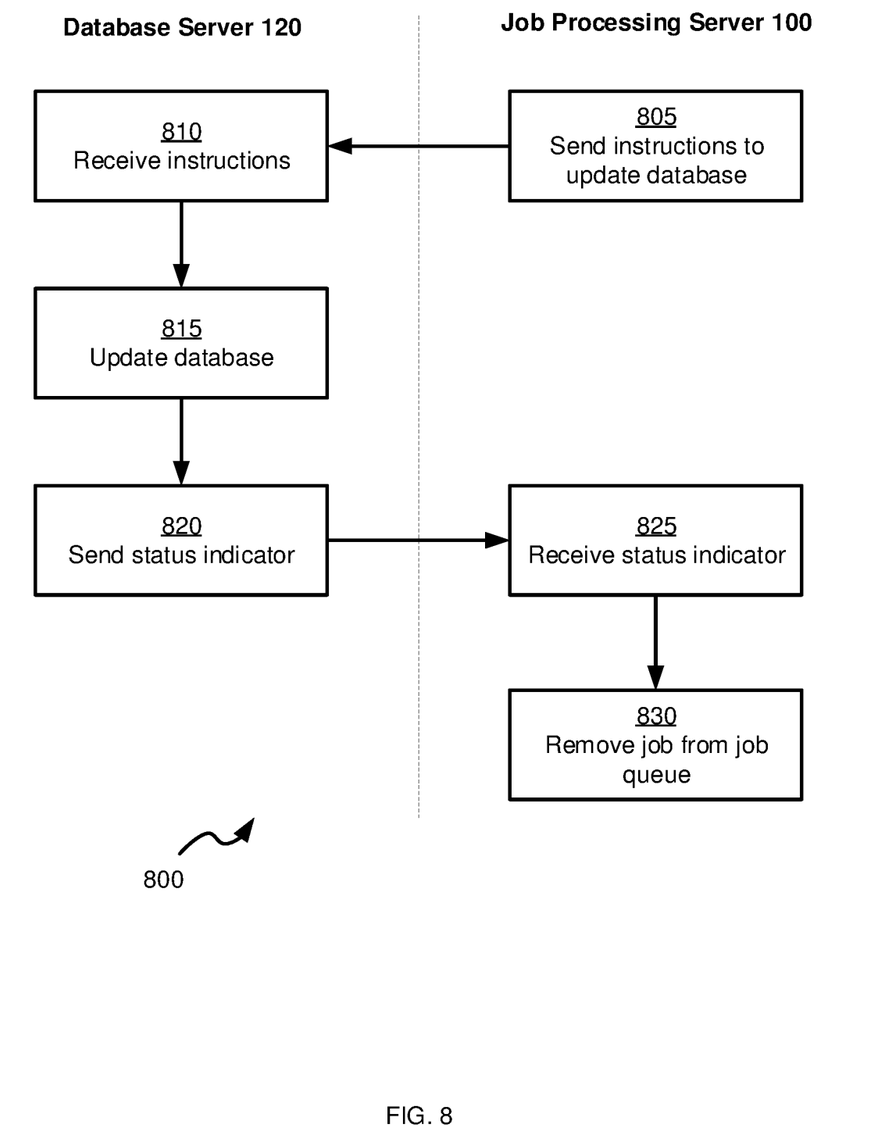
FIG. 8 depicts a method for processing a job in the system of FIG. 1.

FIG. 8 depicts a method 800 for processing a job to update a portion of the database 122. The method 800 will be described in conjunction with its performance within the system 10, and particularly by the job processing server 100 and the database server 120.

Prior to the method 800, at block 205 of the method 200, the server 100 detects job initiation data at the database server 120. The job initiation data can be in the form of an update to the database 122, such as a task added to a matter, a new matter or a new client record, the addition of a client record to a matter, a new personnel profile, a flag or data value in a field, or the like. The job initiation data can indicate further updates such as a field requiring population (e.g. a complexity level field or tier requiring population, contact information requiring populating on a matter), updates to access controls (e.g. barring an employee from viewing certain matters, or allowing an employee to view certain matters), or the like.

At block 210 of the method 200, the server 100 retrieves job parameters from the database 122. The job parameters can include field identifiers to identify the field for population, the data value with which to populate the field, and the like. The job parameters may be specified, for example, by the job initiation data itself. In other examples, the job parameters may be retrieved by the server 100 from another portion of the database 122. For example, when a new matter is created, the job processing server 100 may be configured to retrieve job parameters to set access control based on access lists specifying personnel permissions defined in the database 122.

At block 215, the server 100 creates a new job and adds the job to the job queue with the job parameters.

Upon detection of the predefined trigger at 220, the job processing server 100 processes the jobs in the job queue, thereby initiating the method 800.

At block 805, the server 100 sends instructions to the database server 120, for example via the network 115.

At block 810, the database server 120 receives the instructions from the job processing server 100.

At block 815, the database server 120 is configured to update the database according to the instructions received at block 810. For example, the database server 120 may update a certain field with a value based on the field identifier and the value specified in the instructions. For example, a complexity level tracking field may be updated with the value "High Complexity." In another example, a client information field may be updated with a particular contact person. In other examples, the database server 120 can update access controls for personnel (e.g. to allow an employee to view a matter or to bar an employee from viewing a matter). The database server 120 may additionally update the status of a task to indicate that the update has been completed.

In some implementations, the database server 120 may be further configured, at block 815, to execute an error handling process (e.g. generating a notification for transmission to an operator). In other examples, the database server 120 may be configured to proceed to block 820 to send a failure indicator to the job processing server 100 for error handling.

At block 820, the database server 120 sends a status indicator to the job processing server 100, for example via the network 115. For example, the status indicator may be a success/failure indicator, or it may simply be a completion indicator.

At block 825, the job processing server 100 receives the status indicator from the database server 120.

At block 830, in response to the receipt of the status indicator, the job processing server 100 removes the job from the job queue. The job processing server 100 can also be configured, at block 830, to log the completed job in the job log. In some examples, in response to receipt of a failed status indicator at block 825, the job processing server 100 can be configured to handle errors.

Those skilled in the art will appreciate that in some embodiments, the functionality of any one or more of the applications 108, 128, 148 and 168 may be implemented using pre-programmed hardware or firmware elements (e.g., application specific integrated circuits (ASICs), electrically erasable programmable read-only memories (EEPROMs), etc.), or other related components.

The scope of the claims should not be limited by the embodiments set forth in the above examples, but should be given the broadest interpretation consistent with the description as a whole.

The invention claimed is:

1. A method comprising:
    storing, at a job processing server, (i) a job queue including a plurality of job records previously created by the job processing server, each job record having corresponding job parameters, and (ii) a plurality of job initiation criteria and corresponding job parameter definitions;
    detecting job initiation data comprising a database update to a primary database hosted by a second server and distinct from the job queue, the database update matching at least one of the job initiation criteria;
    responsive to detecting the job initiation data, retrieving new job parameters at the job processing server from the primary database based on the job parameter definitions corresponding to the at least one job initiation criterion;
    creating, at the job processing server, a new job record including the new job parameters, and storing the new job record in the job queue; and
    responsive to detecting expiry of a predefined trigger time, processing the plurality of job records and the new job record in the job queue, by:
        for each job record in the job queue, generating and sending instructions, based on the corresponding job parameters, for execution by the second server to perform an update to the primary database;
        receiving a status indicator from the second server, the status indicator indicating a status of the update;
        responsive to receiving the status indicator, removing the job record from the job queue.

2. The method of claim 1, wherein detecting job initiation data comprises periodically querying the primary database for the job initiation data.

3. The method of claim 1, wherein detecting job initiation data comprises receiving the job initiation data responsive to a database trigger procedure initiated on the primary database at the second server.

4. The method of claim 1, wherein the predefined trigger comprises a time of day.

5. The method of claim 1, further comprising initiating a job queue timer in response to creating the new job record in the job queue; and wherein the predefined trigger comprises a time of the job queue timer elapsing.

6. The method of claim 1, wherein processing the job further comprises generating a log line in a job log at the job processing server.

7. A job processing server comprising:
    a memory storing (i) a job queue containing a plurality of job records previously created by the job processing server, each job record having corresponding job parameters, and (ii) a plurality of job initiation criteria and corresponding job parameter definitions;
    a communications interface; and
    a processor interconnected with the memory and the communications interface, the processor configured to:
        detect, via the communications interface, job initiation data comprising a database update to a primary database hosted by a second server and distinct from the job queue, the database update matching at least one of the job initiation criteria;
        responsive to detecting the job initiation data, retrieve, via the communications interface, new job parameters from the primary database based on the job parameter definitions corresponding to the at least one job initiation criterion;
        create a new job record including the new job parameters, and store the new job record in the job queue; and
        responsive to detecting expiry of a predefined trigger time, process the plurality of job records and the new job record in the job queue, by:
            for each job record in the job queue, generating and sending, via the communications interface, instructions based on the corresponding job parameters for execution by a second server to perform an update at the second server;

receiving a status indicator from the second server, the status indicator indicating a status of the update;

responsive to receiving the status indicator, removing the job record from the job queue.

8. The job processing server of claim 7, wherein the processor is further configured to query the primary database for the job initiation data.

9. The job processing server of claim 7, wherein the processor is further configured to receive the job initiation data responsive to a database trigger procedure initiated on the primary database at the second server.

10. The job processing server of claim 7, wherein the predefined trigger comprises a time of day.

11. The job processing server of claim 7, wherein the processor is further configured to initiate a job queue timer in response to creating the new job record in the job queue; and wherein the predefined trigger comprises a time of the job queue timer elapsing.

12. The job processing server of claim 7, wherein the processor is further configured to generate a log line in a job log at the job processing server.

\* \* \* \* \*